United States Patent [19]
Possati

[11] 3,811,404
[45] May 21, 1974

[54] MEASUREMENT INSTRUMENT WITH DEVICE FOR INDICATING THE LIMITS OF TOLERANCE

[76] Inventor: Mario Possati, Viale Carducci 23, 40125 Bologna, Italy

[22] Filed: June 28, 1971

[21] Appl. No.: 157,549

[30] Foreign Application Priority Data
July 10, 1970  Italy.................................. 3484/70

[52] U.S. Cl. ........... 116/129 R, 73/432, 116/129 B, 324/113
[51] Int. Cl. .............................................. G09f 9/00
[58] Field of Search ........ 116/129 R, 129 A, 129 T, 116/133, 116; 324/157, 29.5; 73/432

[56] References Cited
UNITED STATES PATENTS

| | | | |
|---|---|---|---|
| 1,723,390 | 8/1929 | Tingley | 116/131 |
| 2,633,819 | 4/1953 | Brown | 116/129 K |
| 3,145,339 | 8/1964 | Gardner et al | 324/157 |
| 3,332,014 | 7/1967 | Orths et al. | 324/157 |
| 3,439,647 | 4/1969 | Baumgaertner et al | 116/129 R |
| 3,499,170 | 3/1970 | Westberg | 324/29.5 |

FOREIGN PATENTS OR APPLICATIONS

| | | | |
|---|---|---|---|
| 73,207 | 9/1953 | Netherlands | 116/129 |

*Primary Examiner*—Louis J. Capozi
*Attorney, Agent, or Firm*—Stevens, Davis, Miller & Mosher

[57] ABSTRACT

A measuring instrument including means for indicating tolerance limits, having a measurement pointer which moves over a scale provided on a panel of the instrument from a position of rest to a position indicating the value of the measurement being made, the scale of the instrument being divided into at least two fields by said tolerance-limit indicating means, at least one of said fields being within the limits of tolerance and at least one being outside said limits.

2 Claims, 2 Drawing Figures

INVENTOR
MARIO POSSATI

BY Stevens, Davis, Miller & Mosher

ATTORNEYS

MEASUREMENT INSTRUMENT WITH DEVICE FOR INDICATING THE LIMITS OF TOLERANCE

The present invention relates to a measuring instrument with means for indicating the tolerance limits, comprising a measurement pointer whch moves over a scale provided on a panel of the instrument from a position of rest to a position indicating the value of the measurement being made, the scale of the instrument being divided into at least two fields by said tolerance-limit indicating means, at least one of said fields being within the limits of tolerance and at least one being outside said limits.

A measuring instrument is known in which the limit-of-tolerance indicating means is formed of two arrows outside the instrument itself and which can be actuated manually in order to bring them into the position indicating the limit of tolerance desired for the measurments being made.

This instrument has the disadvantage that these indicating arrows are difficult to see, so that a substantial visual effort is required of the operator, and furthermore, as the arrows are on the outside, they may easily be shifted from their proper position by an accidental blow without the operator being aware of this error.

In another known instrument, the two arrows are within the apparatus and are visible through a circular slot provided on the panel of the instrument. The movements of the two arrows are controlled by two knobs arranged on the front of the instrument. The instrument has the drawback that the indicating arrows are very difficult to see and therefore require an excessive effort from the operator.

The technical problem which the present invention is directed at solving is to create an instrument in which the arrows which indicate the limits of tolerance are clearly visible and cannot be shifted by accidental blows.

This technical problem is solved by the measurment instrument of the invention which is characterized by the fact that the means indicating the limit of tolerance comprises a sector arranged below the panel of the instrument in alignment with a slot provided on the panel, said sector being capable of being manually positioned so that its edge corresponds with the desired limit of tolerance, the sector in this position completely engaging the slot for one of the fields.

The following description illustrates a preferred embodiment of the invention, given by way of illustration and not of limitation, with reference to the following drawings in which.

Figure 2:
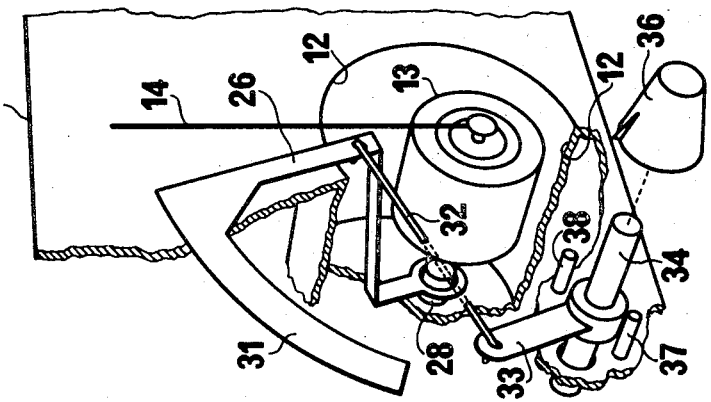
FIG. 2 is a left front perspective view of certain parts of the instrument of FIG. 1.
Figure 1:
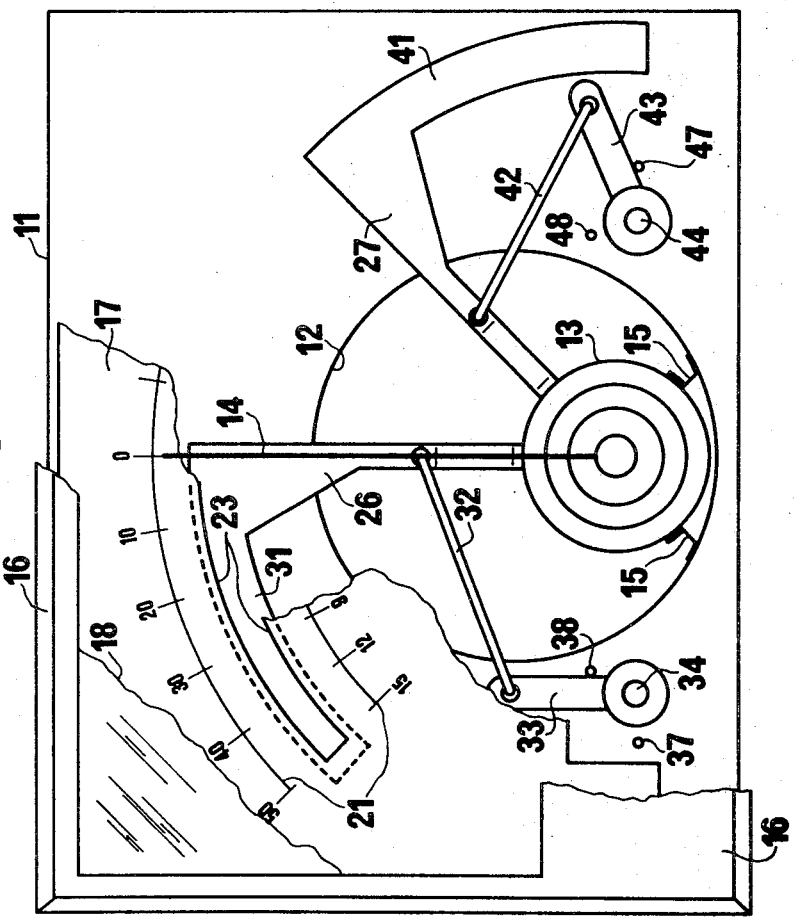
FIG. 1 is a front view, partially in section, of the measuring instrument of the invention.

The measuring instrument of the invention is contained in a case comprising a rear plate 11 provided with a cylindrical cavity 12 in which the control group 13 for the measurement pointer 14 is fastened by means of two supports 15. This control group 13 is known per se and in any event does not constitute an object of the present invention. The case furthermore comprises a front plate 16 which substantially frames the panel 17 of the instrument which is protected by a transparent glass 18. On the panel of the instrument there are drawn various reading scales 21, two of which are schematically indicated in the drawings, in order to permit the reading of different values or to permit the insertion of different levels of sensitivity for the same value.

On the panel there is furthermore provided a slot 23 which extends parallel to the reading scales 21 and substantially over the entire extent of said scales. Behind the panel 17 there is arranged a pair of levers 26 and 27 pivoted on a pin 28 which is fastened at the rear of the cylindrical cavity 12. The two levers 26 and 27 are suitably shaped to avoid the block formed by the control group 13.

The lever 26 is provided with a circular sector 31 arranged opposite the slot 23 and colored differently from the panel 17. The lever 26 is connected by a connecting rod 32 to a crank 33 fastened to a shaft 34 which is rotatable on the case of the instrument. The shaft 34 is provided with a knob 36 which can be manually actuated to rotate the crank 33 and therefore, via the rod 32, also the lever 26. Corresponding to the crank 33 there are provided two pins 37 and 38 which limit the stroke of the said crank and therefore of the circular sector 31.

Similarly, the lever 27 is provided with a circular sector 41 which is also of different color than the panel 17. The sector 41 is arranged at the slot 23 and is in substantially symmetrical position with respect to the circular sector 31. The lever 27 is connected by a connecting rod 42 to a crank 43 fastened on a shaft 44 which is rotatable on the case of the instrument. The shaft 44 is provided with a knob (not shown in the drawings) which can be operated by hand to rotate the crank 43 and therefore, by means of the rod 42, also the lever 27. The crank 43 cooperates with two pins 47 and 48 which limit the stroke of the crank 43 and therefore of the circular sector 41.

The two sectors 31 and 41 may thus be manually positioned with their edges arranged at any desired position of the scale. By suitably coloring these sectors, the position of the measurment pointer 14 with respect to the sectors there is made very obvious and therefore whether the part being measured is within or outside the limits of tolerance.

It is apparent that various changes may be made in the measurement instrument described above without going beyond the scope of the present invention. For example, the zero point may be arranged at one end of the scale and therefore there may be only a single sector to divide the range of the scale. The two sectors may furthermore cover the region within the limits of tolerance, rather than the region outside of them.

If the measurement instrument has a scale of linear type, the device for indicating the limits of tolerance may be made, for instance, by means of fabric or metal, closed or open, colored tapes, which are movable by rotation of pulleys on which they are wound.

What is claimed is:

1. A measuring instrument having means for indicating tolerance limits, comprising: a panel having a slot formed therein and a scale drawn thereon adjacent said slot; said scale being divided into a plurality of fields for indicating tolerance limits, one of said fields being within said tolerance limits and bounded by other fields outside said limits; a measurement pointer movable with respect to said scale from a position of rest substantially adjacent the center of said scale to a position indicating the value of a measurement being made; first and second members disposed behind said panel and said pointer and of a different color such that said members are viewable through said slot; and means to move said members independently along said scale to bring an edge thereof into correspondence with a desired point on said scale to define the limits of tolerance around said position of rest of said pointer, said first and second members comprising elongated, arcuately-shaped members, said slot and scale being correspondingly arcuately shaped; and wherein said instrument further comprises:

two shafts mounted on said instrument;
two levers coupled one to each of said shafts; and
means coupling said levers one to each of said members for moving said members over an arcuate path corresponding to their arcuate shapes to adjust the dimensions of said fields for defining said tolerance limits.

2. A measuring instrument having means for indicating tolerance limits, comprising: a panel having a slot formed therein and a scale drawn thereon adjacent said slot; said scale being divided into a plurality of fields for indicating tolerance limits, one of said fields being within said tolerance limits and bounded by other fields outside said limits; a measurement pointer movable with respect to said scale from a position of rest substantially adjacent the center of said scale to a position indicating the value of a measurement being made; first and second members disposed behind said panel and said pointer and of a different color such that said members are viewable through said slot; and means to move said members independently along said scale to bring an edge thereof into correspondence with a desired point on said scale to define the limits of tolerance around said position of rest of said pointer, said slot and said first and second members being similarly arcuately shaped, said members being co-axially mounted on said instrument behind said panel; said instrument further comprising means for independently moving said members rotatably with respect to each other along the paths defined by their arcuate shapes.

* * * * *